F. SWICKARD.
FLYTRAP.
APPLICATION FILED JAN. 23, 1920.

1,353,672.

Patented Sept. 21, 1920.

Inventor
Frank Swickard
By Brownet Phelps
Attorneys

UNITED STATES PATENT OFFICE.

FRANK SWICKARD, OF FORT BRIDGER, WYOMING, ASSIGNOR OF NINETY-NINE PER CENT. TO LAURA J. SWICKARD, OF FORT BRIDGER, WYOMING.

FLYTRAP.

1,353,672.   Specification of Letters Patent.   Patented Sept. 21, 1920.

Application filed January 23, 1920. Serial No. 353,542.

*To all whom it may concern:*

Be it known that I, FRANK SWICKARD, a citizen of the United States, residing at Fort Bridger, in the county of Uintah and State of Wyoming, have invented certain new and useful Improvements in Flytraps, of which the following is a specification.

This invention relates to fly traps and more particularly to that class of such devices adapted to be used as a combined fly trap and exterminator which is so constructed as to provide an ornamental structure presenting an attractive appearance and concealing the flies which have been trapped and confined in the exterminating liquid, means being further incorporated in the construction of the device to comprise a flower holding receptacle.

The primary object of this invention is to provide a sanitary fly trap and exterminator which shall be easy to clean, efficient in operation and inexpensive to manufacture, at the same time forming an attractive ornament in addition to the trapping function.

With the foregoing and other objects in view as will hereinafter appear, this invention consists in the peculiar arrangement and combination of the various related parts of a fly trap and exterminator as described in the following specification and more particularly pointed out in the annexed claims.

Figure 1:
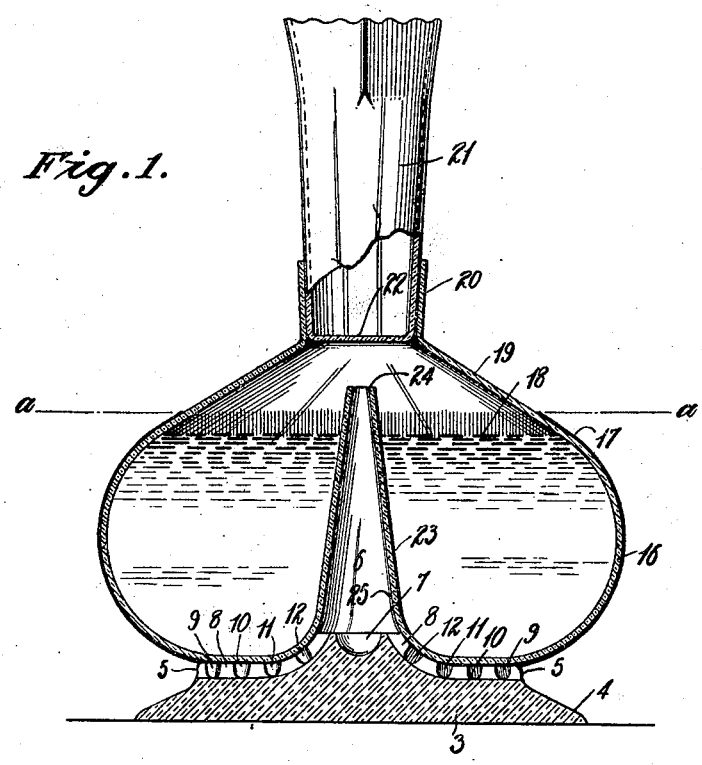
Figure 2:
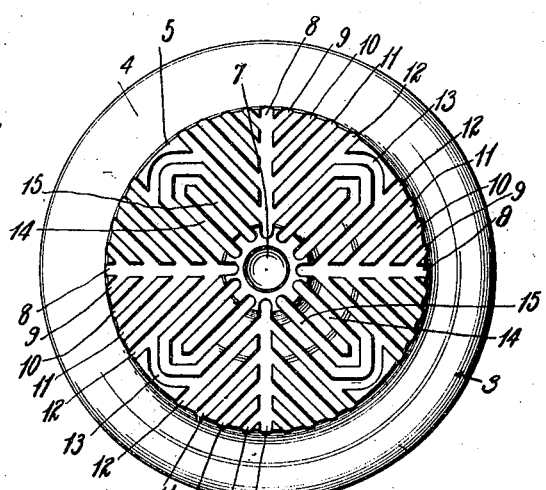

Referring to the accompanying drawings forming a portion of this specification, illustrating the preferred embodiment of this invention and in which like characters of reference indicate the same parts wherever used, Figure 1 is a vertical section through the device and Fig. 2 is a top plan view of the base section.

3 designates a base preferably formed of glass or the like and having an annular portion 4 from which extends a raised central portion 6 having a bait holding cup 7.

Between the portion 6 and the exterior periphery of the abutment 5, and in connection with the bait receptacle 7, there are formed a plurality of main grooves 8, extending to the periphery of the abutment 5, having a series of grooves 9—10—11—12 angularly disposed thereto and in communication therewith, and also extending to the periphery of the abutment 5, the adjacent grooves 12 of each of the series being interconnected by V shaped grooves 13 which do not extend to the periphery of the abutment 5.

Adjacent the grooves 13 and located between them and the portion 6 are V shaped reëntrant grooves 14 having branches 15 and 16, the said branches opening into the walls of the bait receptacle 7.

Suitably shaped to rest upon the base 3 so as to form a closure for the open portion of the grooves just described to provide passages through the abutment 5 is a vessel 16' of glass or the like having its exterior coated or otherwise treated to form an ornamental opaque surface 17 up to the line *a—a* of Fig. 1 in order to conceal the insecticide solution 18 contained within the vessel 16'.

The portion of the vessel 16' above the line *a—a* presents a transparent part 19 above which the walls thereof are contracted to form a neck 20 which receives a vase 21 for flowers or the like forming with its closed end 22 a stopper for the vessel 16' easily removable for the cleansing of such vessel and the refilling thereof with the insecticide solution 18 above referred to. The bottom of the vessel 16' is provided with an inwardly projecting tubular entrance passageway 23, having an opening 24 above the opaque coating 17 and in the plane of the transparent portion 19 and concentric with the bait cup 7, the interior wall 25 of the member 23 being so disposed as to lie in prolongation of the grooves 8 as they are continued upwardly through the portion 6.

In operation the device just described functions in the following manner:

Flies, or other insects, attracted by the bait in the cup 7 will alight upon the annular portion 4 and in search of the bait enter the passageways formed by the grooves 8 and the communicating grooves 9—10—11 and 12.

In seeking an exit the member 23 presents the easiest mode thereof, the insects being additionally attracted thereto by light which enters through the transparent portion 19 illuminating the opening 24, thus causing the insects to circulate within the vessel 16' above the solution 18 contact with which will exterminate such insects, the presence of which in said solution is effectively concealed by the opaque portion 17.

The reëntrant passageways formed by the grooves 13 and 14—15 form a means for baffling the escape of insects from the device as do the V grooves 13 which communicate with the outer air only through the grooves 8 which also enter the cup 7.

It will thus be seen that there is provided an efficient and ornamental device of the character set forth, sanitary and easy to clean and refill and devoid of the usual objectionable features of the usual fly traps.

While a preferred embodiment of the invention is herein shown and described, this invention is limited only to the scope of the annexed claims and not to the particular illustrated form.

What I claim as new and desire to secure by United States Letters Patent is:

1. In a fly trap, in combination, a base, a vessel on said base and forming therewith a plurality of entrance and reëntrant passageways, entrance means for said vessel and an insecticide carried by said vessel.

2. In a fly trap, in combination, a base, a vessel removably mounted on said base and forming therewith a plurality of entrance and reëntrant passageways, entrance means for said vessel and an insecticide carried by said vessel.

3. In a fly trap, in combination, a base having an outer annular portion, a concaved portion within said annular portion, grooves in said concaved portion, a raised portion within the said concaved grooved portion, and a vessel removably mounted on said base and forming with the concaved grooved portion thereof a plurality of passageways, entrance means for said vessel, and an insecticide carried by said vessel.

In testimony whereof I affix my signature in the presence of two witnesses.

FRANK SWICKARD.

Witnesses:
M. V. PETERMAN,
C. W. LAHMAN.